April 5, 1932.    J. JESSEN    1,852,613
MACHINE FOR ASSEMBLING PISTON RINGS ON PISTONS
Filed Nov. 13, 1930    2 Sheets-Sheet 1

Inventor
Jacob Jessen
By
Attorneys

April 5, 1932. J. JESSEN 1,852,613
MACHINE FOR ASSEMBLING PISTON RINGS ON PISTONS
Filed Nov. 13, 1930 2 Sheets-Sheet 2
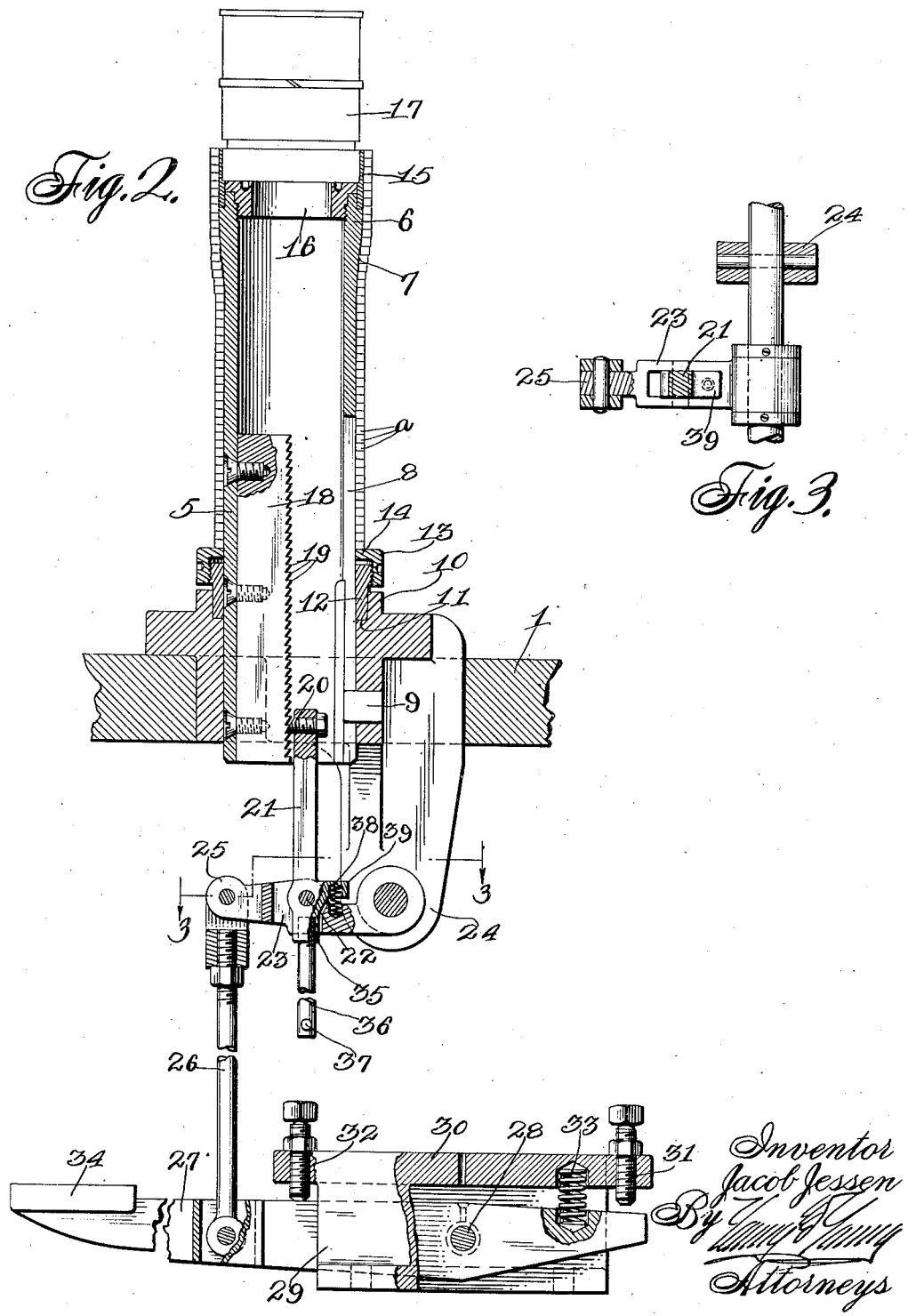

Patented Apr. 5, 1932

1,852,613

UNITED STATES PATENT OFFICE

JACOB JESSEN, OF KENOSHA, WISCONSIN

MACHINE FOR ASSEMBLING PISTON RINGS ON PISTONS

Application filed November 13, 1930. Serial No. 495,413.

This invention relates to improvements in machines for assembling piston rings on pistons.

One of the objects of the present invention is the provision of an improved type of machine whereby piston rings can be quickly and readily assembled on pistons, and the machine is so constructed and arranged that various sized rings can be placed on pistons of different sizes, the rings properly assembled in the grooves of the piston regardless of the location of the grooves in the piston.

Another object of the present invention is the provision of a machine of the above type, wherein the piston rings are assembled on a movable cylinder and through power actuated means, an intermittent movement is imparted to the cylinder for discharging the piston rings therefrom into the grooves of the piston, and the cylinders of a machine are provided with means whereby the grooves of the piston can be positioned for receiving the rings from the cylinders to be fitted into the different grooves of the piston.

A further object of the present invention is the provision of a machine of the above character, wherein a number of cylinders are used and have mounted thereon, a plurality of piston rings, the upper ends of the cylinders being provided with guide bands of different widths, and a removable stop plug, whereby pistons can be positioned in the different cylinders so that the various grooves therein will be positioned flush with the upper edge of the guide band, whereby the rings of the cylinder and guide band can be properly assembled in their respective grooves in the piston through intermittent movement of the cylinder by power operated mechanism.

With the above and other objects in view, the invention consists in the novel features of construction, the combination and arrangement of parts hereinafter more fully set forth, pointed out in the claims and shown in the accompanying drawings wherein:

Figure 2 is a vertical sectional view through one of the cylinders and taken at right angles to Figure 1; and, Figure 3 is a detailed transverse section on the line 3—3 of Figure 2.

Figure 1:
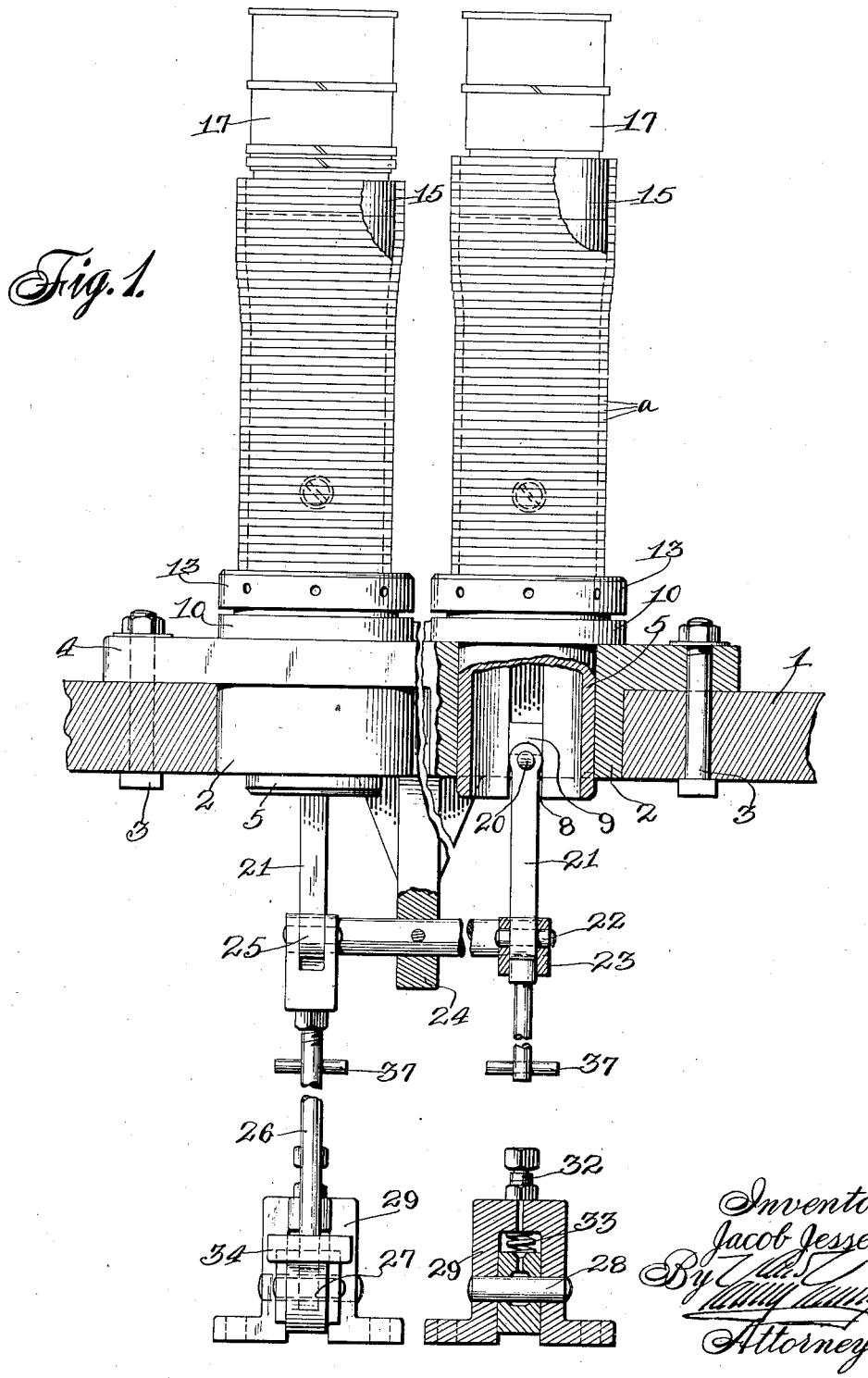
Figure 1 is a front elevation of the machine, illustrating two of the cylinders arranged in close proximity to each other, with parts of the device broken away and illustrated in cross section.

In the construction and setting up of this type of machine, it is preferred to use a number of cylinders, and these cylinders are mounted in supporting bases which are bolted or otherwise secured to any suitable type of support. The support, however, is arranged at a suitable height from the floor surface and may consist of a bench, table, or other suitable type of support, the top of which is generally indicated by the numeral 1 in the drawings. The cylinders used in connection with this improved machine are arranged in parallel relation extending longitudinally of the top 1, and are mounted in bearing sleeves 2 which fit within suitable openings in the top member 1 and are retained in position by means of bolts 3 which extend through flanges 4, connected with the bearing sleeves 2.

Slidably mounted within the bearing sleeves 2, are the cylinders 5 which project upwardly, as shown in the drawings, and are formed with enlarged upper ends 6, and with tapered outer surfaces 7. Each cylinder is provided with a longitudinal groove 8 which receives the inner end of a stud 9 carried by the bearing sleeve 2 to permit sliding movement of the cylinder, but retain the same against rotation.

Each bearing sleeve is provided with an upstanding annular flange 10 which is offset from the central bore of the bearing sleeve to form a shoulder 11. Fitting within the annular flange 10 and resting upon the shoulder 11 is a sleeve 12, the upper end of which projects beyond the upper edge of the flange 10, and is threaded to receive the adjustable collar 13. This collar is provided with an inwardly extending horizontal flange 14 which embraces the exterior of the cylinder 5 and forms a support for the piston rings $a$ mounted on the cylinder, as shown in Figure 2.

Positioned over the upper end of each cylinder is a guide sleeve 15, and threaded into the upper end of each cylinder, is a stop plug 16 which forms a base or support for the piston 17, when the piston is inserted in the outer end of the guide sleeve 15, as shown in Figure 2.

It will be noted in Figure 2, that the uppermost ring has its upper or outer surface flush with the upper end of the guide sleeve 15, and this ring is moved into this position through the movement of the adjustable collar 13.

Arranged within each cylinder 5 is a longitudinal bar 18 having a series of teeth 19 in its inner longitudinal edge, as shown in Figure 2, and cooperating with these teeth is a pin 20 carried by the pivoted arm 21. The arm 21 is pivoted at 22 on the swinging support 23. The support 23 has one end pivotally attached to the depending bracket 24, formed integral with the bearing sleeve 2. The other end of the member 23 is provided with a perforated ear 25, and pivotally connected thereto is a rod 26 having its lower end pivotally connected to a rockable treadle 27.

The treadle member 27 is pivotally mounted on the cross pin 28 carried by the housing 29 beneath platform 30. One end of the treadle member 27 engages an adjustable stop pin 31 upon movement of the treadle in one direction, and a second stop pin 32, arranged upon the opposite side of the pivot, from the pin 31 engages the treadle member upon movement in the opposite direction for limiting the movement of the same. Thus, the treadle member is restricted in its rocking movement in either direction. Normally, the member 23 is retained in a horizontal position, as shown in Figure 2, and this is accomplished through the medium of a coil spring 33, one end of which bears against the platform 30, and the other end bearing against one end of the rockable treadle at one side of the pivot. At the other side of the pivot from the spring 33, the rockable treadle is provided with a foot piece 34, whereby the operator can readily press downwardly on the outer end of the treadle member for actuating the rockable member 23 and rod 21.

It will be apparent from the foregoing that in loading the piston rings a on each one of the cylinders 5, the pin 20 is disengaged from the teeth 19 to permit the cylinder being removed from the bearing sleeve 2. A number of piston rings are then placed on the cylinder from the inner end, and the cylinder is returned to its position in Figure 2. After the cylinder has been returned, the collar 13 is adjusted so as to move the piston rings outwardly on the cylinder to cause the outer face of the outermost ring to lie substantially flush with the outer end of the guide sleeve 15. The piston 17 is then fitted into the guide sleeve 15 as shown in Figure 2, and the operator presses down the foot piece 34, rocking the treadle member 27 on its pivot, which movement will impart a rocking movement to member 23, pulling downwardly on arm 21. At this time, I wish to call attention to the fact that the pin 31 is adjusted to such a position as to permit sufficient downward movement of the treadle member for moving the cylinder 5 downwardly, a distance equal to the width of one of the piston rings, so that the topmost piston ring will be removed from the cylinder and contracted into the groove in the piston.

As stated heretofore, several cylinders 5 are used in this type of machine and each cylinder is provided at its outer end with a different width guide sleeve, and the plug 16 is disposed at different distances inwardly of the sleeve 15, whereby the piston can be placed in the proper guide sleeve according to the position of the groove to receive the ring.

Each cylinder 5 is provided with a tapered outer surface 7, so that as the rings are urged upwardly over the surface of the cylinder, due to the movement of the cylinder through the bearing sleeve, the rings on the cylinder are expanded so that when they are discharged from the guide sleeve 15, it will readily snap into the proper groove on the piston.

The lower end of the pivoted arm 21 is provided with a socket 35 and threaded into this socket is a bar 36, carrying a handle 37 whereby arm 21, which carries pin 20, can be actuated independently of the movement of the treadle member 27. Normally, the pin 20 is retained in engagement with the teeth 19, through the medium of a coil spring 38, one end of which bears against a lateral projection 39 on arm 21, while the other end bears against the rockable member 23. The tension of this coil spring 38 is sufficient to normally retain the pin 20 in engagement with the teeth 19. However, when lateral movement is imparted to bar 36, the spring 38 will be readily compressed.

One of the main features of this invention is the fact that through the operation of the cylinder 5, each consecutive ring will be properly positioned for immediate discharge from the end of the cylinder into the proper groove in the piston ring. By using the adjustable stop pins 31 and 32, the movement of the treadle member is restricted in both directions, and this movement is restricted equal to the width of a piston ring, so that upon each downward movement of the outer end of a treadle member, the cylinder 5 is moved a distance equal to the width of a piston ring.

When the uppermost ring on the cylinder is discharged therefrom, the consecutive ring will be moved to discharging position, and as the treadle member returns to its normal position, the stop pin 32 will limit its movement so that pin 20 will be moved into engagement with the teeth of the bar 18 in correct position for again advancing the cylinder a distance equal to the width of the next ring in order.

Attention is directed to the fact that the stop plug 16 which forms the base of the seat for the cylinder 17 can be adjusted relative to the cylinder for properly seating the cylinder in the guide sleeve so that the groove in the piston will be correctly positioned for receiving the uppermost ring on the cylinder.

From the above description taken in connection with the accompanying drawings, it will be readily apparent that I have provided a simple and inexpensive machine for quickly assembling piston rings on pistons, and wherein by merely inserting in the outer end of the cylinder 5 and pressing down onto the treadle member, a piston ring can be quickly positioned in its proper groove in the piston. The construction and operation of the device is comparatively simple for this type of machine, and due to the simplicity of construction, the same can be manufactured and placed on the market at a very low cost.

While I have shown and described the preferred embodiment of my invention, it will be apparent from the foregoing that slight changes may be made in the construction when putting the invention into practice without departing from the spirit of the same or the scope of the appended claims.

I claim:

1. A device for assembling piston rings on pistons comprising a stationary support, a bearing sleeve secured to the support and extending through the same, a reciprocatory cylinder slidable in the sleeve, a piston ring seat surrounding the cylinder and adjustably mounted on the sleeve, a guide sleeve carried by the upper end of the cylinder for receiving a piston, and means for moving the cylinder relative to the piston ring seat in a step-by-step movement.

2. A device for assembling piston rings on pistons comprising a stationary support, a bearing sleeve secured to the support and extending therethrough, a cylinder slidably mounted within the bearing sleeve, a piston ring seat surrounding the cylinder and carried by the bearing sleeve, a stop plug carried by the cylinder forming a seat for a piston, a guide sleeve connected with the cylinder and surrounding the stop plug for surrounding a piston above the stop plug, means for moving the cylinder through the guide sleeve in a step-by-step movement, and means for initially adjusting the cylinder within the bearing sleeve relative to the piston seat.

3. A device for assembling piston rings on pistons comprising a stationary support, a bearing sleeve rigidly secured to the support, a cylinder slidably mounted within the bearing sleeve, a piston ring seat surrounding the cylinder and connected with the bearing sleeve, a piston guide sleeve carried by the upper end of the cylinder, the upper end of the cylinder gradually increasing in diameter from an intermediate point toward its upper end, a rack bar secured to the cylinder, a pivoted lever rockably supported below the support, an arm pivotally connected with the lever having a dog for engaging the teeth of the rack bar, spring means actuating the arm for normally holding the dog toward the rack bar, treadle means for actuating the lever, and means for limiting the rocking movement of the treadle in both directions.

4. A device for assembling piston rings on pistons comprising a stationary support, a bearing sleeve rigidly secured to the support, a cylinder slidably mounted within the bearing sleeve, a piston ring seat surrounding the cylinder and connected with the bearing sleeve, a piston guide sleeve carried by the upper end of the cylinder, the upper end of the cylinder gradually increasing in diameter from an intermediate point toward its upper end, a rack bar secured to the cylinder, a pivoted lever rockably supported below the support, an arm pivotally connected with the lever having a dog for engaging the teeth of the rack bar, spring means actuating the arm for normally holding the dog toward the rack bar, treadle means for actuating the lever, means for limiting the rocking movement of the treadle in both directions, and means for manually operating the arm against the tension of its spring means independent of the lever.

In testimony that I claim the foregoing I have hereunto set my hand at Kenosha, in the county of Kenosha and State of Wisconsin.

JACOB JESSEN.